United States Patent [19]

Anttila et al.

[11] 4,400,130
[45] Aug. 23, 1983

[54] METHOD AND APPARATUS FOR HANDLING AND TRANSPORTING A LOAD

[75] Inventors: Arjo Anttila, Tampere; Reijo Tiitto, Pirkkala, both of Finland

[73] Assignee: Valmet OY, Finland

[21] Appl. No.: 276,176

[22] Filed: Jun. 22, 1981

[30] Foreign Application Priority Data

Jun. 24, 1980 [FI] Finland ............................. 802015

[51] Int. Cl.³ ............................................. B60P 1/64
[52] U.S. Cl. ................................... 414/478; 414/786; 280/43.23
[58] Field of Search ............... 414/469, 474, 476, 477, 414/480, 486, 498, 786, 478; 280/43.23, 43

[56] References Cited

U.S. PATENT DOCUMENTS 3,638,817 2/1972 Corompt ............................. 414/417
4,260,315 4/1981 Bouffard ............................. 414/469

Primary Examiner—Robert B. Reeves
Assistant Examiner—James Barlow
Attorney, Agent, or Firm—Steinberg & Raskin

[57] ABSTRACT

Apparatus for handling and transporting a load including at least one container or the like, such as between a ro/ro vessel and a terminal, include load transporting apparatus including a frame assembly having at least two members which are telescopically displaceable with respect to each other, power apparatus and a traction-providing and steering wheel assembly mounted on a first one of the frame members. The load transporting apparatus are provided with load handling apparatus for taking-up the load from and then depositing the load on the ground surface. The handling apparatus include at least one load lifting device mounted on the first one of the frame members and at least one moveable bogie assembly mounted on a second one of the frame members which is longitudinally displaceable with respect to the first frame member. The bogie assembly can be raised and lowered. According to the method of the invention, the load is lifted until a first lower edge thereof is lifted from the ground surface to a loading height whereupon the bogie assembly is moved under the load until it is located in a position between the center of gravity of the load and a second lower edge of the load which is resting on the ground surface. The second edge of the load is lifted using the bogie assembly from the ground surface to a transporting height while the first edge of the load is lowered from the loading height to the transporting height.

12 Claims, 9 Drawing Figures

METHOD AND APPARATUS FOR HANDLING AND TRANSPORTING A LOAD

BACKGROUND OF THE INVENTION

The present invention relates to methods and apparatus for handling and transporting a unit load including at least one container or the like and which are particularly suited for use in connection with handling and transporting the load between a ro/ro vessel and a terminal.

More particularly, the present invention relates to methods and apparatus for handling and transporting a load through the use of load transporting apparatus which are moveable on wheels along a ground surface and which are provided with a load handling system for taking-up the load from and then depositing the load on the ground surface.

According to the so-called ro/ro method, a load is transported into a vessel and out therefrom in a substantially horizontal plane by wheeled apparatus. Such method is economical and provides a high load handling capacity by virtue of the use of large load units, such as containers, as well as pallets, roll trailers, trailers, etc. Various types of machines have been utilized for handling the cargo sorted into the units described above, the most common including tow trucks for the roll trailers and trailers, and straddle trucks for the containers, pallets, fork lift trucks, etc.

Such arrangements are not entirely satisfactory, however, in that when the containers, open pallets or the like are transported by a roll trailer, a separate step is necessary for loading the container or pallet onto the roll trailer and, similarly, to unload the container or pallet from the roll trailer. A separate crane or truck is required for this operation in order to lift the containers. Of course, the roll trailer or load pallet constitutes an additional mass which must be transported which is still another drawback of the conventional arrangements. Moreover, the pallets, roll trailers and other load handling equipment of this type must be provided in numbers equivalent to three times the cargo capacity of the vessel thereby representing a significant capital cost.

The various drawbacks described above can be avoided by providing a load handling arrangement wherein the conventional tow truck and roll trailer combinations or other separate transporting apparatus are replaced by equipment which itself is adapted to effect the loading and unloading operations for the load transported thereby. Such self-loading vehicles and trailers of this type are commonly employed in road transport operations as well as in connection with the transporting of containers. For example, in one conventional arrangement of this type, containers to be transported are either loaded or taken-up from the ground by hauling the same onto a transporting vehicle using a wire or chain-type pulling apparatus which is attached to the end of the container. Such arrangements utilize a so-called exchangeable platform principle and are disclosed, for example, in Finnish Pat. No. 55 313. Additionally, arrangements are known wherein the containers are placed upon legs or suitably designed load platforms and are taken-up therefrom by a transporting vehicle which has been driven under the load, the height of the load space of the vehicle being adjustable, e.g., pneumatically or hydraulically. Arrangements of this type are illustrated in, for example, Finnish Pat No. 55 628 and U.S. Pat. No. 4,053,072. Moreover, arrangements of the latter type may include moveable bogies or separate bogies provided with a lifting shape, in order to increase their flexibility. In this connection, reference is made to U.S. Pat. No. 3,719,299.

However, although the self-loading arrangements of the type described above are well suited for road transport over relatively long distances, such arrangements are not efficient in applications where the load is transported over relatively short distances such, for example, as in the case of terminal applications. Thus, in such applications the mooring time of the vessel is necessarily short and for this reason the ro/ro arrangements described above are required in order to effect the loading and unloading of the containers in a short time and in order to facilitate the handling of the load in cramped spaces.

SUMMARY OF THE INVENTION

Accordingly, one object of the present invention is to provide new and improved methods and apparatus for handling and transporting a load for use in lieu of the conventional combination of a tow truck and roll trailer and which is better suited than such conventional arrangements for use in handling standard containers or like unit loads over short transporting distances and, in particular, in terminal applications.

Briefly, in accordance with the present invention, this and other objects are attained by providing a method for handling and transporting a load including at least one container or the like utilizing wheel mounted load transporting means adapted to move over a ground surface and which are provided with load handling means for taking-up the load from and then depositing the load on the ground surface, the load handling means including at least one load lifting means and at least one moveable bogie assembly, the method including lifting the load until a first lower edge of the load is lifted from the ground surface to a loading height, moving the bogie assembly under the load until it is located in a position between the center of gravity of the load and a second lower edge of the load which is resting on the ground surface, and lifting the second edge of the load by means of the bogie assembly from the ground surface to a transporting height and/or lowering the first edge of the load from the loading height to the transporting height. In this manner, the load is taken-up and is ready for being transported by the transporting means.

According to the apparatus of the invention, the load transporting means includes a frame assembly having at least two members which are longitudinally displaceable with respect to each other, such as by being telescopically associated with each other. Load handling means are associated with the load transporting means for taking-up the load from and then depositing the load on the ground surface. The handling means include at least one load lifting means mounted on a first one of the frame members together with power means and a traction-providing and steering wheel assembly. At least one moveable bogie assembly is mounted on a second one of the frame members which is longitudinally displaceable with respect to the first frame member so that after the load is lifted the bogie assembly can be moved from an inner position adjacent to the load lifting means to an outer position beneath the load.

Moreover, according to a preferred embodiment of the invention, the bogie assembly can be raised and lowered such that upon the bogie assembly being moved under the load it can be raised to lift the load to a transporting height.

The method and apparatus of the present invention provide an economical load handling system which does not require any separate steps or apparatus for loading the cargo, e.g., container or open pallet, to be transported onto a transporting base or roll trailer. Significant economies in transport are achieved since there is no requirement for investments in expensive roll trailer equipment and the like. At the same time, the transporting of useless or unnecessary mass is reduced. In this connection, the ratio between the useful load transported by the transporting apparatus and the weight of the apparatus itself, which approaches 2.5, is exceptionally favorable relative to conventional designs.

By providing a variable wheel base for the load transporting means, i.e., the variable length frame assembly, the apparatus is extremely flexible in transporting containers having varying lengths and ease of operation is significantly improved.

DESCRIPTION OF THE DRAWINGS

A more complete understanding of the present invention and many of the attendant advantages will be readily appreciated as the same becomes better understood by reference to the following detailed description when considered in connection with the accompanying drawings in which.

DESCRIPTION OF THE PREFERRED EMBODIMENTS

Figure 1A:
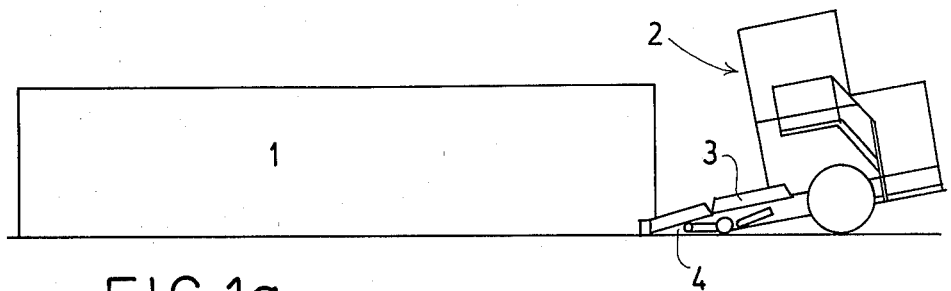
FIGS. 1a–1d are schematic illustrations of the apparatus of the present invention illustrating the successive steps constituting the method of the invention.

Referring now to the drawings wherein like reference characters designate identical or corresponding parts throughout the several views, FIG. 1 illustrates the steps of the method of the present invention wherein a load 1 is taken-up by a load transporting means 2 movably mounted on wheels. The load transporting means 2 are provided with a load handling system including a load lifting apparatus 3 and a displaceable bogie assembly 4 for the purpose of taking-up the load from and then depositing the load on the ground surface. As described in greater detail hereinbelow, the bogie assembly 4 is displaceable from an inner position adjacent to the load lifting apparatus 3 to an outer position displaced longitudinally from its inner position by means of a telescoping frame assembly 5, 5', 5", and 5''' or the like and the height of the bogie assembly may be selectively changed by means of a bogie lifting mechanism 6. In the illustrated embodiment described below, the load constitutes a 40 foot container which conforms to the I.S.O. standards and which is fitted with conventional corner pieces for fixing the same as described below.

Figure 1B:
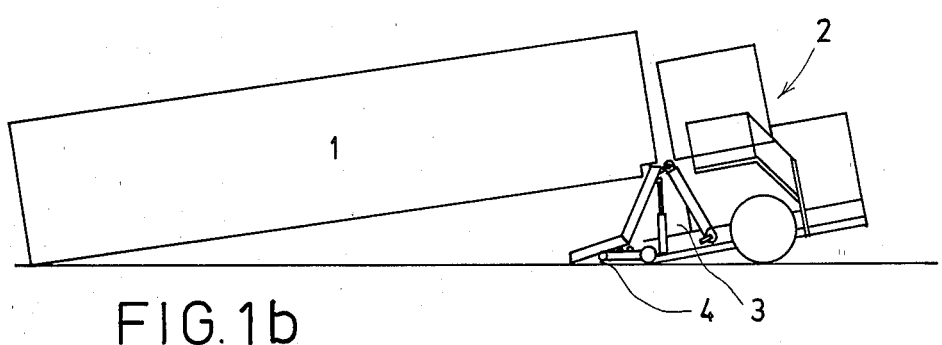
Figure 1C:
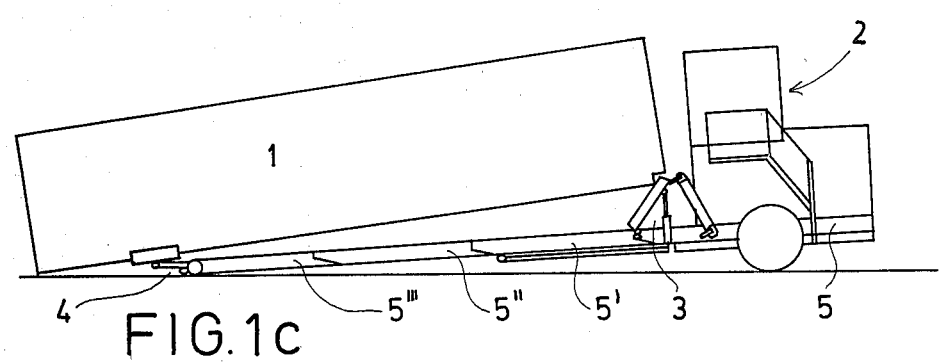

When loading or taking-up the load, the transporting means 2 is driven to a location adjacent to one end of the container 1 which is resting on the ground surface which may constitute, for example, the pavement of a terminal or the deck of a ship as best seen in FIG. 1a. The lifting apparatus 3 is coupled to the lower corner pieces of the container 1. Referring to FIG. 1b the load 1 is lifted until a first lower edge of the load which is closest to the load transporting means 2 is lifted from the ground surface to a loading height whereby the container assumes the tilted position illustrated in FIG. 1b. While the container is in the tilted position, the bogie assembly 4 is moved under the load until it is located in a position between the center of gravity of the load and a second lower edge of the load which is resting on the ground surface. The bogie assembly is moved by the telescoping structure 5, 5', 5", 5''' of the frame assembly. This step is illustrated in FIG. 1c.

Figure 1D:
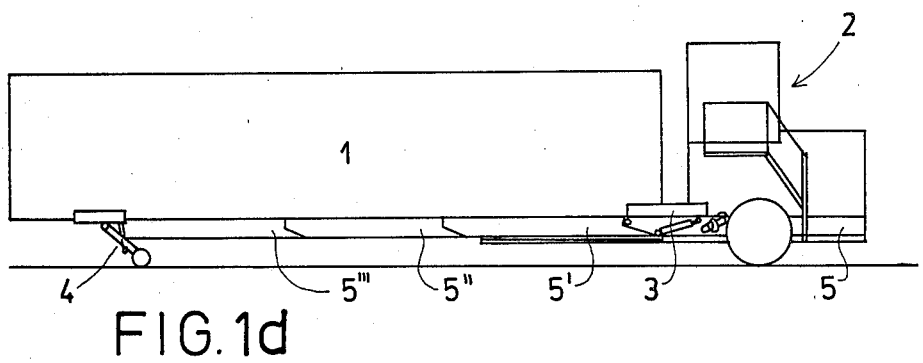

Finally, the container 1 is turned into a horizontal transporting position by lifting the second edge of the container which is resting on the ground surface to a transporting height and lowering the first edge of the load from the loading height to the transporting height. This operation is illustrated in FIG. 1d and upon the container 1 attaining this position, it can be transported to the unloading station.

The load is then deposited or unloaded at the unloading station substantially by carrying out the method described above in inverted order. Thus, the front end of the load is lifted into an upper i.e., loading, position by means of the lifting apparatus 3 whereupon the rear end of the load is lowered until its rear or second edge rests on the ground surface by lowering the bogie assembly 4 to its lower position illustrated in FIG. 1c. The bogie assembly, which is now free of load, is retracted to its inner position illustrated in FIG. 1b whereupon the forward or front edge of the load is lowered by the lifting apparatus 3 until it rests on the ground surface. The lifting apparatus is then separated from the load 1.

Figure 2A:
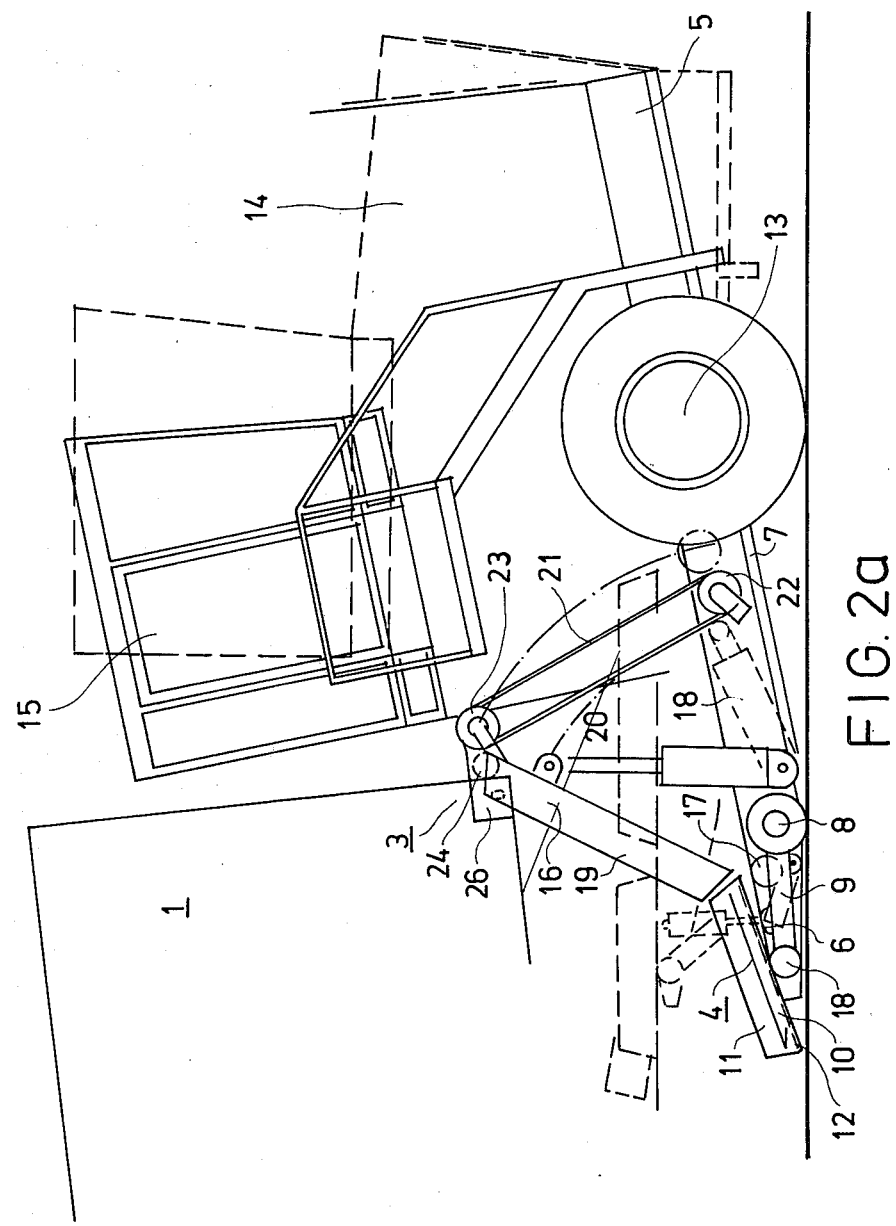
FIGS. 2a and 2b are side and end elevational views of load transporting apparatus according to the present invention and illustrated in a position in which one end of the load has been lifted into an upper or loading position.
Figure 2B:
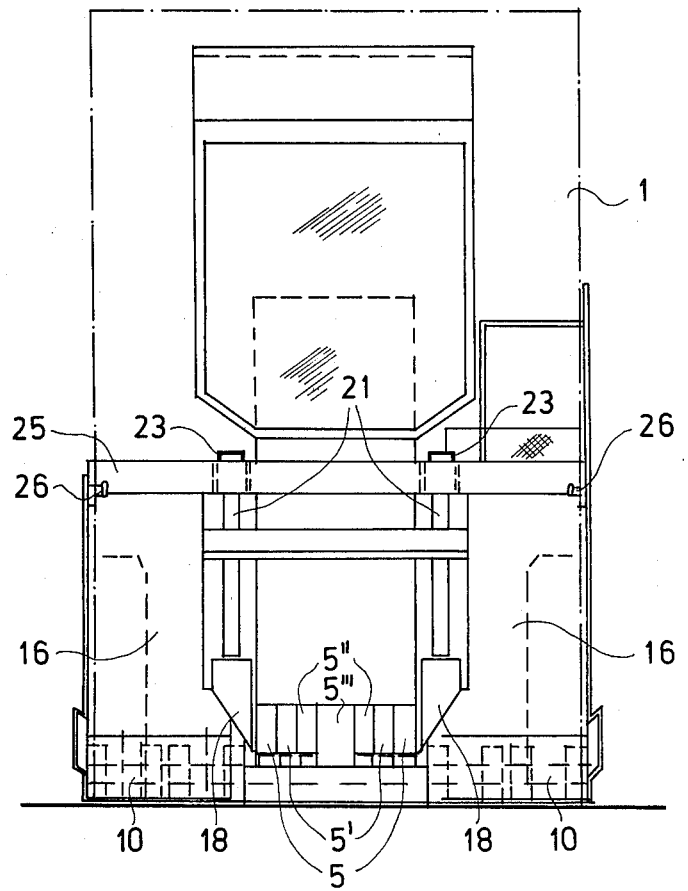
Figure 3:
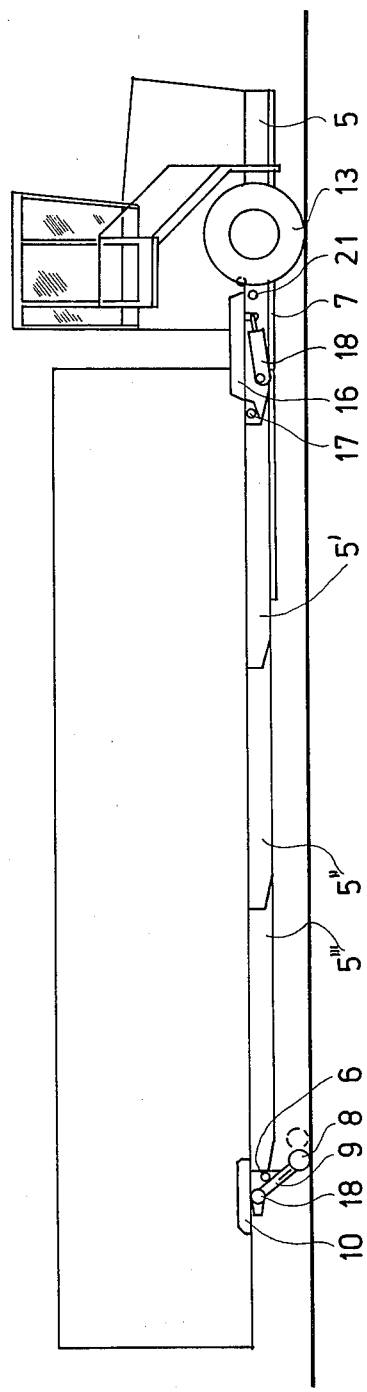
FIG. 3 illustrates the load transporting apparatus of the present invention after the same has lifted the load into its load-transporting position.

Referring to FIGS. 2a, 2b and 3, load handling and transporting apparatus according to the present invention are illustrated. The lifting apparatus 3 and bogie assembly 4 are illustrated in FIG. 2a in solid lines in that condition in which a first lower edge of the load has been lifted from the ground surface to a loading height and is also designated in dotted lines to designate the condition where the transporting apparatus can be driven without the load coupled thereto. In FIG. 2b the load is shown in phantom for the sake of clarity.

The load transporting means include a frame assembly which in the illustrated embodiment comprises four frame members 5, 5', 5" and 5''' which are telescopically associated with each other so that respective frame members may move longitudinally with respect to each other between an inner position, depicted in FIG. 2a, and an outer end position depicted in FIG. 3. Each of the frame members except for the innermost frame member 5''' comprises a structure including two longitudinal frame beams. The frame members 5, 5', 5" and 5''' are preferably roller-guided with respect to each other and are mutually connected by transporting chain links. The two outermost frame members 5" and 5''' are moveable with respect to each other by means of a double-action power cylinder 7 mounted between these frame members and which is operable from the hydraulic system of the machine.

The end of the frame 5 which is located on the side of the load, i.e., the left-side end of frame 5 as seen in FIG. 2a, is supported by the bogie assembly 4 which has been mounted for movement with the innermost frame member 5''' of the telescopic frame assembly. The bogie assembly 4 comprises in the illustrated embodiment four parallely disposed bogies, each having a pair of wheels 8 of the type used on roll trailers. The wheels 8 of the bogies are attached to the frame of the bogie assembly 4 by means of bogie arms 9 which are rotatably journaled by their upper ends. In its innermost position illustrated in FIG. 2a, the wheels 8 of the bogie assembly 4 contact the ground surface so that the transporting means is moveable over the ground surface without a load 1 being coupled thereto.

The bogie assembly 4 may be raised and lowered by means of hydraulic lifting cylinders 6. Thus, FIG. 2a illustrates the bogie assembly 4 in its lowered position while FIG. 3 illustrates the bogie assembly in its raised position. As noted above, the bogie assembly 4 is affixed to the innermost frame member 5''' which acts as the bogie moving arm of the telescopic frame assembly.

In order to support the load 1, bogie platforms 10 are provided on either side of the bogie assembly. Each bogie platform 10 comprises a planar supporting portion and a flange 11 provided on an outer edge for guiding the load 1 in a lateral direction.

The forward end of the load transporting means 2, i.e., the right end as seen in the figures, is supported by traction-providing and steering wheel assembly 13 which is mounted on a transverse beam forming part of the outermost frame member 5. The traction wheels are driven by a power transmission means (not shown) by power apparatus accomodated within the space 14 of frame member 5. Furthermore, a drivers cab 15 provided with the requisite controls is mounted on the frame member 5 over the engine space 14.

The lifting appartus 3 is also mounted on the frame member 5. The lifting apparatus comprises a pair of lifting platforms 16 provided on respective lateral sides of the apparatus, each of the lifting platforms 16 being tiltable through pivotal attachment to the frame member 5 with the aid of bearings 17. The lifting platforms 16 may be tilted by means of hydraulic cylinders 18 which are operated by the hydraulic system of the machine. The lifting platforms 16, like the bogie platforms 10, are each defined by a planar load-supporting portion 20 having a guiding flange 19 provided on its outer marginal edge.

Figure 4A:
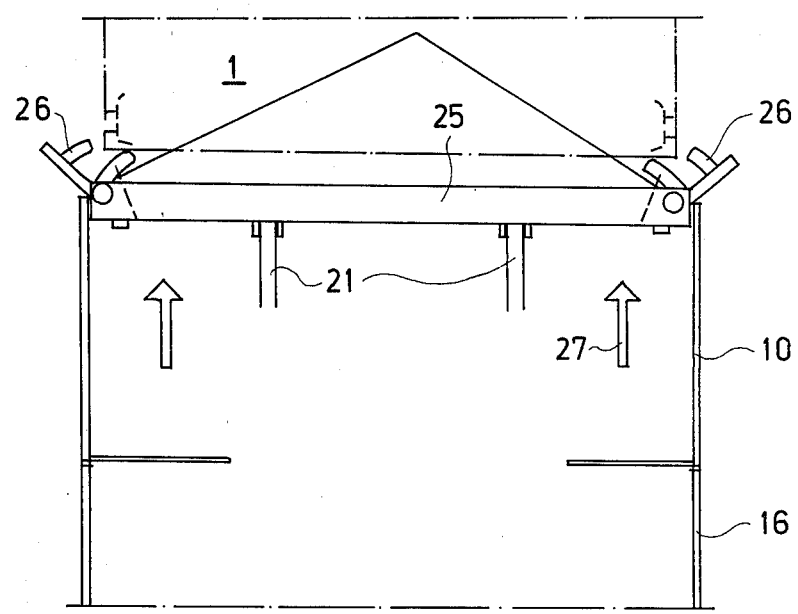
FIGS. 4a and 4b are schematic fragmentary plan views of apparatus for coupling the load transporting means of the invention to the load, when approaching the load and subsequent to coupling, respectively.

The lifting platforms 16 of the lifting apparatus 3 and the bogie platforms 10 of the bogie assembly 4 are so disposed that with the bogie assembly in its inner position and with the lift platforms 16 tilted, the platforms define a fluted track for guiding the load 1 the edge of the load 1 being capable of sliding on this track to the upper end of the lifting platforms 16. To this end, the lifting apparatus 3 includes a chain mecanism including lifting chains which are attached to chain fasteners provided on the end of the lifting platforms 16. The lifting chains 21 travel over lower pulleys 22 which are affixed to the frame 5 and over upper, moveable pulleys 23 provided on the upper ends of the tilted lifting platforms 16. The chains are affixed at their other ends to the transverse beam 25 (FIG. 4) of a grabbing or coupling member 24 adapted to be attached or coupled to the load 1. In this connection, a pair of grabbing spindles 26 are pivotally attached to the ends of the beam 25 so as to be rotatable about a vertical axis. The grabbing spindles 26 are normally maintained in an open position as shown in FIG. 4a by a compression spring inserted between a transverse leg of the corner piece and the grabbing beam. The longitudinal legs of the corner piece are provided with pins which fit into the holes in the lower corner piece of the container or the like. The grabbing member may further be provided with a set of supporting rollers (not shown) which are supported on the bogie and lifting platforms 10 and 16 as the load is lifted.

The operation of the apparatus described above will now be set forth. When taking-up a load, the bogie assembly 4, in its inner position, is lowered and the lifting apparatus 3 is in its lower position. The transporting apparatus is driven towards the load 1 in the direction of arrows 27 in FIG. 4a until it hits against the stops constituted by the transverse legs of the corner piece on the grabbing member whereupon the spindles 26 are rotated as seen in FIG. 4b into suitable coupling holes formed on the load 1.

Figure 4B:
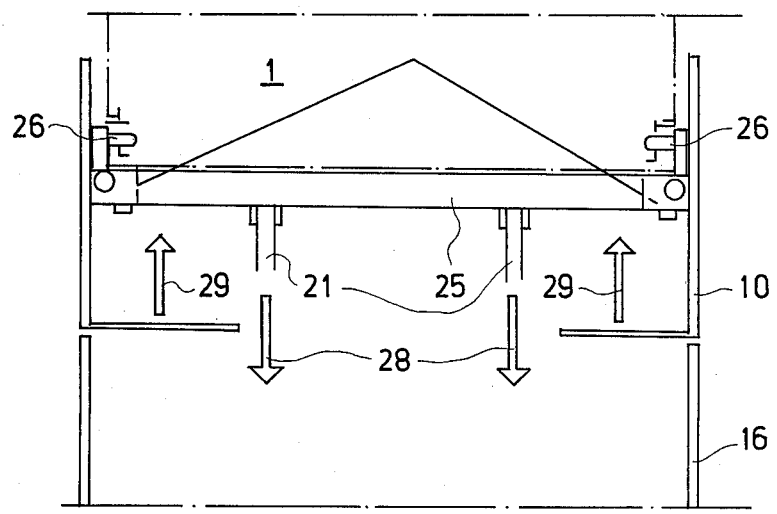

After the coupling operation, the lifting platforms 16 of lifting apparatus 3 are lifted by means of the platform-tilting cylinders 18 whereupon the lifting chains 21 become taut and pull the grabbing member 24 and the end of the load 1 coupled thereto in the direction of arrows 28 in FIG. 4b. The coupled end of the load 1 is guided by the roller tracks constituted by the platforms 10 and 16, first over the bogie assembly 4 then along the tilted load lifting platform 16 into the upper position illustrated in FIGS. 2a and 2b. As the lifting platforms 16 are tilted, the transporting means begins to move towards the load 1 in the direction of arrows 29 in FIG. 4b.

At this time, the bogie assembly 4 is moved under the load by the aid of power cylinder 7 and the frame members 5', 5" and 5''' to which it is connected and which are displaceable with respect to the frame member 5. When the bogie assembly is in its outermost position (FIG. 1c) under the load, it is then raised to its upper position with the aid of the bogie raising cylinder 6. The tiltable load lifting platforms 16 are lowered into a transporting position upon frame member 5 with the aid of tilting cylinder 18. In this manner the load 1 is taken-up by the apparatus of the invention and is in suitable position for transport to the desired destination.

On arrival at the unloading station, the lifting platforms 16 are lifted to raise the first edge of the load from the transporting height to the loading height by means of the tilting cylinders 18. The bogie assembly 4 is lowered by bogie cylinders 6 to lower the second edge of the load from the transporting height until it rests on the ground surface. The bogie assembly is then retracted or moved from under the load to a position adjacent to the load lifting means, i.e., its inner position. The lifting platforms 16 are then lowered while driving the transporting means forwardly whereby the forward end of the load descends, first along the platforms 16 of the lifting apparatus 3 and thereafter along the bogie platforms 10 until the first edge of the load rests on the ground surface as seen in FIG. 1a. The bogie assembly 4 is then raised into the position indicated by the dotted line to the FIG. 2a and in this position, the transporting means may be driven without any load coupled thereto.

Although the apparatus of the present invention has been described above with respect to a particular embodiment thereof, it is understood that the same may be modified in various ways without departing from within the scope of the invention. For example, the method of the invention may be such that the variation of the height of the bogie assembly 4 may be omitted in which case the bogie assembly need not be of the type having a changeable height. In such a case, the lifting and lowering of the load is accomplished exclusively by the lifting apparatus 3 which in this case will have a larger lifting height. The load may comprise, in lieu of the standard container illustrated herein, an open load pallet or other kind of unit load which can be handled in the manner described above. The load may also comprise a stack of several containers in which case the bogie assembly and wheels must be designed to account for the larger load. For example, the number of bogie wheels vary, depending on the particular application.

Of course, numerous other modifications and variations of the present invention are possible in the light of the above teachings. It is therefore to be understood that within the scope of the claims appended hereto, the invention may be practiced otherwise than specifically disclosed herein.

What is claimed is:

1. A method for handling and transporting a load including at least one container or the like, such as between a ro/ro vessel and a terminal, utilizing wheel mounted load transporting means adapted to move over a ground surface and which are provided with load handling means for taking-up the load from and then depositing the load on the ground surface, said load handling means including at least one load lifting means and at least one movable bogie assembly, comprising the steps of:

coupling the load lifting means to the load;
lifting the load until a first lower edge of the load which is closest to the load transporting means is lifted from the ground surface to a loading height;
moving the bogie assembly with respect to the load lifting means under the load until it reaches a certain position between the center of gravity of the load and a second lower edge of the load, said second lower edge of the load resting on the ground surface when the bogie assembly reaches said certain position; and
lifting the second edge of the load using the bogie assembly from the ground surface to a transporting height and lowering the first edge of the load from the loading height to the transporting height;
whereby the load is taken-up and ready for being transported by said transporting means.

2. The method of claim 1 wherein the load is deposited after being transported by said transporting means by a method comprising the steps of:

lowering the second edge of the load using the bogie assembly from the transporting height until it rests on the ground surface with the bogie assembly under the load in the certain position when the second edge of the load rests on the ground surface, and raising the first edge of the load from the transporting height to the loading height;
moving the bogie assembly from under the load to a position adjacent to the load lifting means;
lowering the load until the first edge of the load is lowered from the loading height to the ground surface; and
uncoupling the load lifting means from the load.

3. Apparatus for handling and transporting a load including at least one container or the like, such as between a ro/ro vessel and a terminal, comprising:

load transporting means including a frame assembly having at least two members which are longitudinally displaceable with respect to each other; power means and a traction-providing and steering wheel assembly mounted on a first one of said frame members;
load handling means provided with said load transporting means for taking-up the load from and then depositing the load on the ground surface, said handling means including at least one load lifting means mounted on said first one of said frame members for lifting the load until a first lower edge of the load which is closest to the load transporting means is lifted from the ground surface to a loading height and at least one moveable bogie assembly mounted on a second one of said frame members which is longitudinally displaceable with respect to the first frame member so that after the load is lifted the bogie assembly is movable from an inner position adjacent to said load lifting means to an outer position beneath the load.

4. The combination of claim 3 wherein said frame members comprise elongate members which are telescopically associated one within the other.

5. The combination of claim 3 wherein said bogie assembly includes a load supporting bogie platform and means associated therewith for raising and lowering the same such that bogie assembly is movable while in a lowered mode under the load to a position between the center of gravity of the load and a second lower edge of the load which is resting on the ground surface, whereupon said bogie assembly is raisable to lift the second edge of the load on said bogie platform from the ground surface to a transporting height and the first edge of the load lowered from the loading height to the transporting height, whereby the load is taken-up and ready for being transported by said transporting means.

6. The combination of claim 5 wherein said load lifting means includes at least one tiltable lifting platform for hauling a first end of the load onto the same.

7. The combination of claim 6 wherein said hauling means includes at least one lifting chain and means adapted for being coupled to the load, one end of said chain being affixed to said coupling means, and wherein said chain is arranged to become taut when said lifting platform is tilted.

8. The combination of claim 6 wherein said bogie platform and said lifting platform each includes a planar portion and a flange adapted to guide the load in a lateral direction.

9. The combination of claim 6 wherein said bogie platform and said lifting platform are longitudinally aligned with each other and wherein when said bogie assembly is in the inner position, said bogie and lifting platforms together define a fluted track for guiding the lifting of the load.

10. The combination of claim 7 wherein said coupling means include a pair of locking spindles pivotally mounted on a transversely extending beam member, each of said spindles being associated with spring means for urging the same to a normally open position, and each of said spindles including stop members adapted to contact the load during the coupling operation whereupon said spindles are pivoted into locking engagement with the load.

11. The combination of claim 6 further including means for tilting said tiltable lifting platform and means for moving one of said frame members with respect to the other of said frame members.

12. The combination of claim 11 wherein said means for tilting said lifting platform and said means for moving said frame members and said means for raising and lowering said bogie assembly comprises hydraulic cylinders.

* * * * *